(12) United States Patent  (10) Patent No.: US 7,068,819 B1
Matson  (45) Date of Patent: Jun. 27, 2006

(54) SYSTEM FOR STORING GEOSPECIFIC DATA

(75) Inventor: Neil Matson, Panama City, FL (US)

(73) Assignee: The United States of America as represented by the Secretary of the Navy, Washington, DC (US)

( * ) Notice: Subject to any disclaimer, the term of this patent is extended or adjusted under 35 U.S.C. 154(b) by 683 days.

(21) Appl. No.: 10/192,907

(22) Filed: Jul. 12, 2002

(51) Int. Cl.
G06K 9/00 (2006.01)
G06F 7/00 (2006.01)
G01C 21/30 (2006.01)
G08G 1/123 (2006.01)

(52) U.S. Cl. .................. 382/113; 340/995.1; 701/200; 707/140.1

(58) Field of Classification Search ................. 382/113
See application file for complete search history.

(56) References Cited

U.S. PATENT DOCUMENTS 5,299,300 A * 3/1994 Femal et al. ............... 345/428
5,353,030 A * 10/1994 Koch et al. ................. 342/169
5,902,347 A * 5/1999 Backman et al. ........... 701/200
6,853,332 B1 * 2/2005 Brookes ..................... 342/191
2003/0142523 A1 * 7/2003 Biacs ............................ 365/1

* cited by examiner

Primary Examiner—Bhavesh M. Mehta
Assistant Examiner—Anthony Mackowey
(74) Attorney, Agent, or Firm—James T. Shephed

(57) ABSTRACT

A system for storing geospecific data for use by an interactive computing environment utilizes separate terrain height data storage and image data storage. The terrain height data storage stores blocks of terrain height data which are defined as discrete terrain heights coinciding with a grid of discrete points at the surface of a planetary body. Terrain heights for each block are stored in a row major order starting with one discrete point of a grid associated therewith being referenced to a latitude and longitude. In a similar fashion, the image data storage stores blocks of image data defined as discrete image intensities coinciding with a grid of discrete points at the surface of the planetary body. Image intensities for each block are stored in a row major order starting with one discrete point of a grid associated therewith being referenced to a latitude and longitude.

12 Claims, 1 Drawing Sheet

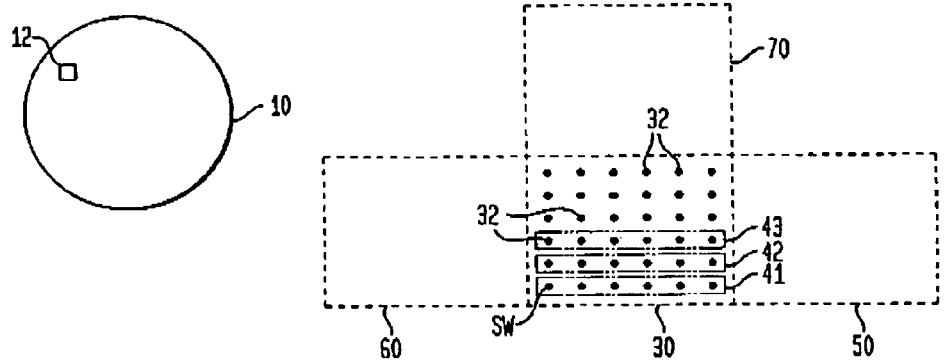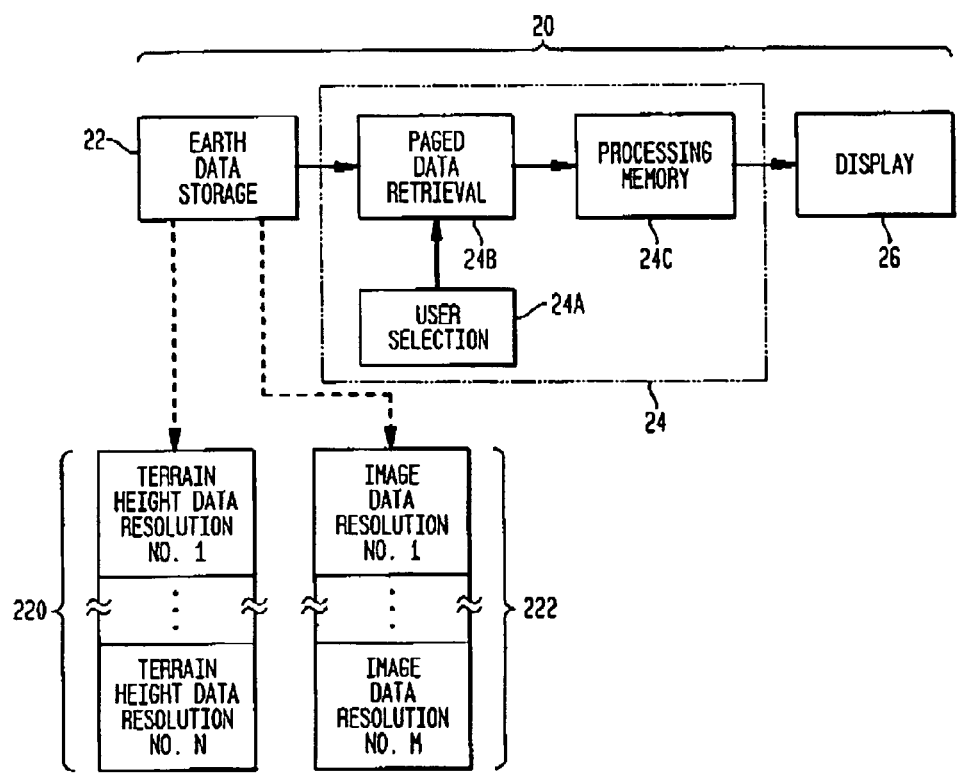

SYSTEM FOR STORING GEOSPECIFIC DATA

ORIGIN OF THE INVENTION

The invention described herein was made in the performance of official duties by an employee of the Department of the Navy and may be manufactured, used, licensed by or for the Government for any governmental purpose without payment of any royalties thereon.

FIELD OF THE INVENTION

The invention relates generally to image processing of geospecific data, and more particularly to a system for storing geospecific data such that an image processing scheme of an interactive computing environment can page in the data "on the fly" in small, localized blocks in order to minimize the amount of data that must be loaded into memory and processed at any given time.

BACKGROUND OF THE INVENTION

Traditional methods of creating and displaying terrain on computers have relied on creating a database that fits completely into main memory. This involves loading geospecific terrain height data and image data at the start of the program. This implementation becomes limited when databases of sufficient resolution and size increase to surpass system memory.

In recognition of this problem, data loading advancements typically involve the "paging in" of data as needed. However, the techniques used to accomplish this and the speed at which they can retrieve and display the data are where image processing software systems differ. Speed is very important in the viewing of visual terrain environments when one wants to quickly move form one area of the world to another. Furthermore, one frequently wants to "fly through" the database. That is, the data may be initially viewed from great altitudes above the terrain while subsequent viewing might be required at a much lower altitude. Since processing memory at any given time is limited, not all data may be loaded when needed. Thus, data associated with a given area/location must be readily identifiable/locatable in the storage database.

SUMMARY OF THE INVENTION

Accordingly, it is an object of the present invention to provide a system for storing geospecific data for use by an interactive computing environment.

Another object of the present invention is to provide a system for storing both terrain height data and image data in an efficient fashion.

Still another object of the present invention is to provide a system for storing terrain height data and image data in a way that provides for efficient locating and reading thereof when a user "flies through" the data.

Other objects and advantages of the present invention will become more obvious hereinafter in the specification and drawings.

In accordance with the present invention, a system for storing geospecific data for use by an interactive computing environment utilizes separate terrain height data storage and image data storage. The terrain height data storage stores blocks of terrain height data which are defined as discrete terrain heights at the surface of a planetary body. Each block of terrain height data defines terrain heights for a grid of discrete points separated by a distance. Thus, each block of terrain height data is said to tile an area of the planetary body. Each block of terrain height data has one of its discrete points referenced to a latitude and longitude of the planetary body. For each block of terrain height data, the terrain heights are stored in a row major order starting with the one discrete point associated therewith that is referenced to a latitude and longitude. The image data storage stores blocks of image data defined as discrete image intensities of an image of the surface of the planetary body. Each block of image data defines the image intensities for a grid of discrete points separated by a distance. Thus, each block of image data is said to tile an area of the planetary body. Each block of image data has one of its discrete points referenced to a latitude and longitude of the planetary body. For each of block of image data, image intensities are stored in a row major order starting with the one discrete point associated therewith that is referenced to a latitude and longitude.

BRIEF DESCRIPTION OF THE DRAWINGS

Other objects, features and advantages of the present invention will become apparent upon reference to the following description of the preferred embodiments and to the drawings, wherein corresponding reference characters indicate corresponding parts throughout the several views of the drawings and wherein:

FIG. 1 is a diagrammatic view of a planetary body (e.g., the earth) with a geographic area of interest depicted thereon;

FIG. 2 is a block diagram illustrating the earth data storage system of the present invention used by an interactive computing environment capable of generating displays of the geospecific data stored by the earth data storage system; and FIG. 3 is a diagrammatic view of a grid of data points that tile a geographic area where the grid of data points define a block of data in the present invention.

DETAILED DESCRIPTION OF THE INVENTION

Referring now to the drawings, and more particularly to FIG. 1 a diagrammatic view of a planetary body (e.g., the earth) is referenced by numeral 10. Throughout the remainder of the description, it will be assumed that planetary body 10 is the earth. However, it is to be understood that the present invention can be used to store geospecific data associated with any planetary body or part thereof.

As is well known in the art, terrain height data and image data for the whole earth 10 are available in digital formats. However, large memory storage devices are required to store all of this data. Unfortunately, most computers used today are personal computers that do not have nearly enough processing memory to store all of the earth's terrain height and image data. Accordingly, it is necessary for image processing software to page in small pieces of this data depending on what a user wants to view. For example, a user may be interested in a geographic area 12, or some smaller portion thereof, on earth 10. The user's initial vantage point may be from a high altitude miles or kilometers above the surface of earth 10. Then, once area 12 is located, the user may want to "fly in" to lower and lower altitudes as a particular "target" is brought into view. As this localization process occurs, the image processing software generally needs to provide a higher resolution than that used when viewing area 12 from higher altitudes.

Viewing area 12 from one or more different altitudes is typically made possible by an interactive computing environment such as the one illustrated and referenced generally by numeral 20 in FIG. 2. Computing environment 20 generally includes: an earth data storage 22 for storing both terrain height and image data; a computer 24 having a user selection block 24A for receiving inputs from a user regarding what locale and viewing altitude are desired, a paged data retrieval block 24B for retrieving blocks of data from earth data storage 24B, and a processing memory block 24C for (image) processing the paged in blocks of data; and a display 26 for displaying the selected blocks of data.

In accordance with the present invention, earth data storage 22 is divided primarily into two separate storage areas, to-wit, terrain height data storage 220 and image data storage 222. Storage 220 and storage 222 can be implemented utilizing separate or the same hardware devices without departing from the scope of the present invention. Each of storage 220 and storage 222 is divided into data blocks that store data associated with a local geographic area of earth 10. Furthermore, each local geographic area of the earth has blocks associated therewith with the data being stored at different resolutions. Accordingly, terrain height data storage 220 stores terrain height data at a plurality of N resolutions with the data blocks associated with each resolution for the entire earth being grouped together in storage. Similarly, image data storage 222 stores image data at a plurality of M resolutions with the data blocks associated with each resolution for the entire earth being grouped together in storage.

In a digital sense, each geographic area can be thought of as a grid of spaced-apart and discrete points. In accordance with the present invention, terrain height data associated with each of these discrete points is simply a value indicative of, for example, a height above sea level. Image data associated with each of these discrete points is a pixel intensity indicative of the world's image at the discrete point. The spacing between adjacent discrete points defines the resolution for that data block.

Regardless of the type of data being stored (i.e., terrain height or image) or its particular resolution, storage of the data is implemented in a manner that will be described with the aid of FIG. 3. In FIG. 3, a square grid of points indicative of a data block is shown and referenced generally by numeral 30. While other grid geometries can be used without departing from the scope of the present invention, a square grid is preferable when the geographic areas are defined in terms of, for example, 1° latitude by 1° longitude (or 1' latitude by 1' longitude) squares. Regardless of its geometry, the area covered by grid 30 covers or tiles a geographic area of the earth. The known row/column spacing between adjacent ones of grid points 32 defines the grid's resolution as well as that of the data block.

The data associated with each grid point 32 of grid 30 is stored in the following fashion. One corner of grid 30 such as the southwest corner (indicated by SW in FIG. 3) is referenced to an earth latitude and longitude. Data storage begins with this point and is referenced to southwest corner SW for any grid 30. In terms of terrain height data, data storage only involves the storing of the terrain height value associated therewith. For image data, data storage involves the storing of the pixel intensity associated therewith. Orderly storage of data associated with the remaining grid points 32 proceeds in a row major format moving from west to east until the end of the row is reached. Then, storage continues by moving north one row on grid 30 and returning for the western-most point (i.e., the leftmost point in FIG. 3) in that row. Thus, data storage proceeds in a west-to-east sequence first along row 41, second along row 42, third along row 43, etc. This same pattern is repeated when moving to the next grid. That is, if grid 30 is on the equator, the next grid stored in storage 22 is the eastern neighbor of grid 30 or grid 50. This approach continues until grid 60 (i.e., the western neighbor of grid 30) is reached. Storage then continues north to grid 70 and again moves east to west. The lower hemisphere data can be stored in a similar fashion.

By storing data in this orderly fashion, the actual data stored can be reduced to a height value (for terrain height data) or a pixel intensity (for image data). File headers can be utilized to identify: i) the latitude/longitude of one grid contained in the file based on its, for example, southwest corner SW, ii) size of the grid, and iii) grid resolution. With this header information and the knowledge of how data is stored, image processing software utilized by computer 24 can build the earth's terrain height model for any local area of interest.

To read a data block associated with a particular area, the image processing software need only determine a file offset or pointer that points to what amounts to the southwest corner of the location of interest. Then, using a "spheroid processing" model, the earth's terrain height polygon model can be built just for the selected locale. The corresponding image data at an appropriate resolution is stored in storage 222 in a similar fashion and then paged into processing memory 24C. The image data is then laid over the terrain height model as is known in the art of image processing.

The "spheroid processing" model referenced above can be based on the WGS-84 spheroid that is a well known set of agreed upon mathematical terms and formulas that model the spherical curvature of the earth. That is, the WGS-84 spheroid takes into account the "squashed" spheroid nature of the earth.

As mentioned above, both terrain height data and image data are stored at multiple resolutions with each resolution requiring one or more files with lower resolutions being stored as one file and higher resolutions being stored as multiple files. Each file typically includes a header that defines the starting latitude/longitude of a first grid in the file, the size of the grid, and the grid resolution. Note that as grid resolution increases, grid size may be reduced to keep file sizes manageable. For example, lower resolution data might be stored in 1° latitude by 1° longitudinal blocks while higher resolution data might be stored in 1' latitude by 1' longitude blocks.

The advantages of the present invention are numerous. The simple and orderly storage system provides for the storage of geospecific data in a localized fashion so that the paging in thereof can be accomplished for just the local area of interest. This will greatly reduce the amount of data that must be handled at any given time by a computer's processing memory. Further, the storage system will increase data throughput since only simple height values and pixel intensities need be stored/paged in. Multiple resolutions are made available so that one can "fly" at different heights above the earth and view the resolution that is most appropriate for a given altitude.

Although the invention has been described relative to a specific embodiment thereof, there are numerous variations and modifications that will be readily apparent to those skilled in the art in light of the above teachings. It is therefore to be understood that, within the scope of the appended claims, the invention may be practiced other than as specifically described.

What is claimed as new and desired to be secured by Letters Patent of the United States is:

1. A system for storing geospecific data for use by an interactive computing environment, comprising:

terrain height data storage for storing blocks of terrain height data defined as discrete terrain heights at the surface of a planetary body, each of said blocks of terrain height data defining said terrain heights for a grid of discrete points separated by a distance wherein each of said blocks of terrain height data tiles an area of said planetary body, each of said blocks of terrain height data having one of said discrete points associated therewith referenced to a latitude and longitude of said planetary body, each of blocks of terrain height data storing said terrain heights in a row major order starting with said one of said discrete points associated therewith referenced to said latitude and longitude; and image data storage separate from said terrain height data storage for storing blocks of image data defined as discrete image intensities of an image of the surface of said planetary body, each of said blocks of image data defining said image intensities for a grid of discrete points separated by a distance wherein each of said blocks of image data tiles an area of said planetary body, each of said blocks of image data having one of said discrete points associated therewith referenced to a latitude and longitude of said planetary body that is the same as said latitude and longitude of said one of said discrete points associated with a corresponding one of said blocks of terrain height data, each of blocks of image data storing said image intensities in a row major order starting with said one of said discrete points associated therewith referenced to said latitude and longitude.

2. A system as in claim 1 wherein said grid for each of said blocks of terrain height data is a square grid.

3. A system as in claim 2 wherein, for each of said blocks of terrain height data, said one of said discrete points associated therewith is a southwest corner of said square grid.

4. A system as in claim 1 wherein said grid for each of said blocks of image data is a square grid.

5. A system as in claim 4 wherein, for each of said blocks of image data, said one of said discrete points associated therewith is a southwest corner of said square grid.

6. A system as in claim 1 wherein, for any of said blocks of terrain height data, said distance is the same for the entirety of said grid associated therewith.

7. A system as in claim 1 wherein, for any of said blocks of image data, said distance is the same for the entirety of said grid associated therewith.

8. A system for storing geospecific data for use by an interactive computing environment, comprising:

terrain height data storage for storing blocks of terrain height data defined as discrete terrain heights at the surface of a planetary body, each of said blocks of terrain height data defining said terrain heights for a grid of discrete points wherein each of said blocks of terrain height data tiles an area of said planetary body and wherein, for each said area of said planetary body, a plurality of said blocks of terrain height data are provided with each one thereof being defined by a unique grid resolution determined by a distance between adjacent ones of said discrete points associated therewith, each of said blocks of terrain height data having one of said discrete points associated therewith referenced to a latitude and longitude of said planetary body, each of blocks of terrain height data storing said terrain heights in a row major order starting with said one of said discrete points associated therewith referenced to said latitude and longitude; and image data storage separate from said terrain height data storage for storing blocks of image data defined as discrete image intensities of an image of the surface of said planetary body, each of said blocks of image data defining said image intensities for a grid of discrete points wherein each of said blocks of image data tiles an area of said planetary body and wherein, for each said area of said planetary body, a plurality of said blocks of image data are provided with each one thereof being defined by a unique grid resolution determined by a distance between adjacent ones of said discrete points associated therewith, each of said blocks of image data having one of said discrete points associated therewith referenced to a latitude and longitude of said planetary body that is the same as said latitude and longitude of said one of said discrete points associated with a corresponding one of said blocks of terrain height data, each of blocks of image data storing said image intensities in a row major order starting with said one of said discrete points associated therewith referenced to said latitude and longitude.

9. A system as in claim 8 wherein said grid for each of said blocks of terrain height data is a square grid.

10. A system as in claim 9 wherein, for each of said blocks of terrain height data, said one of said discrete points associated therewith is a southwest corner of said square grid.

11. A system as in claim 8 wherein said grid for each of said blocks of image data is a square grid.

12. A system as in claim 11 wherein, for each of said blocks of image data, said one of said discrete points associated therewith is a southwest corner of said square grid.

* * * * *